(12) United States Patent  
Sasabe et al.

(10) Patent No.: US 7,898,926 B2  
(45) Date of Patent: Mar. 1, 2011

(54) OPTICAL PICKUP

(75) Inventors: Mitsuyoshi Sasabe, Daito (JP); Mika Hamaoka, Daito (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 498 days.

(21) Appl. No.: 12/019,248

(22) Filed: Jan. 24, 2008

(65) Prior Publication Data

US 2008/0181084 A1 Jul. 31, 2008

(30) Foreign Application Priority Data

Jan. 25, 2007 (JP) ............... 2007-015097

(51) Int. Cl.  
*G11B 7/00* (2006.01)

(52) U.S. Cl. .............. 369/112.02; 369/44.28; 369/112.03

(58) Field of Classification Search ............. 369/112.02  
See application file for complete search history.

(56) References Cited

U.S. PATENT DOCUMENTS

| 6,577,376 | B1 | 6/2003 | Shih |
| 2004/0108984 | A1 | 6/2004 | Ogasawara |

FOREIGN PATENT DOCUMENTS

| JP | 2004-178773 | 6/2004 |
| JP | 2005-202323 | 7/2005 |
| JP | 2006-12344 | 1/2006 |
| JP | 2006-252655 | 9/2006 |
| JP | 2006-286028 | 10/2006 |

OTHER PUBLICATIONS

Patent Abstracts of Japan for Japanese Publication No. 2006-252655, Publication date Sep. 21, 2006 (2 pages).  
Patent Abstracts of Japan for Japanese Publication No. 2006-012344, Publication date Jan. 12, 2006 (2 pages).  
Patent Abstracts of Japan for Japanese Publication No. 2005-202323, Publication date Jul. 28, 2005 (2 pages).  
Patent Abstracts of Japan for Japanese Publication No. 2006-286028, Publication date Oct. 19, 2006 (2 pages).  
Patent Abstracts of Japan for Japanese Publication No. 2004-178773, Publication date Jun. 24, 2004 (2 pages).  
Extended European Search Report for European Application No. 08000859.2-1232, mailed on Jun. 11, 2008 (8 pages).

*Primary Examiner*—Jorge L Ortiz Criado  
(74) *Attorney, Agent, or Firm*—Osha • Liang LLP

(57) ABSTRACT

The liquid crystal element includes a pair of transparent substrates, a liquid crystal arranged between the substrates, a diffraction pattern including concentric diffraction electrodes formed on one substrate, and a phase shift pattern including concentric phase shift electrodes formed on the other substrate. The diffraction pattern includes a first region being of a constant range in a radial direction from a center and having a wide electrode interval, a second region being arranged on the outer side of the first region and having a narrow electrode interval, and a third region being arranged on the outer side of the second region and including a single diffraction electrode. An additional electrode facing the phase shift electrode is arranged in a gap between the diffraction electrodes in the first region.

2 Claims, 7 Drawing Sheets

FIG. 2
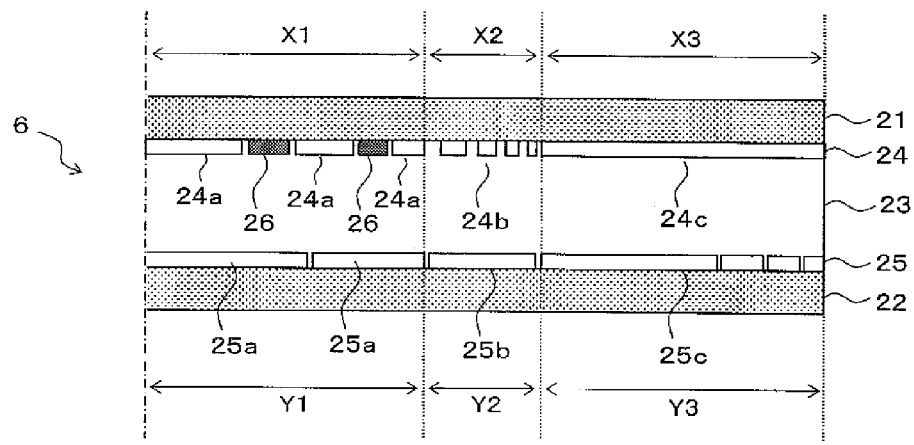
FIG. 3A
FIG. 3B
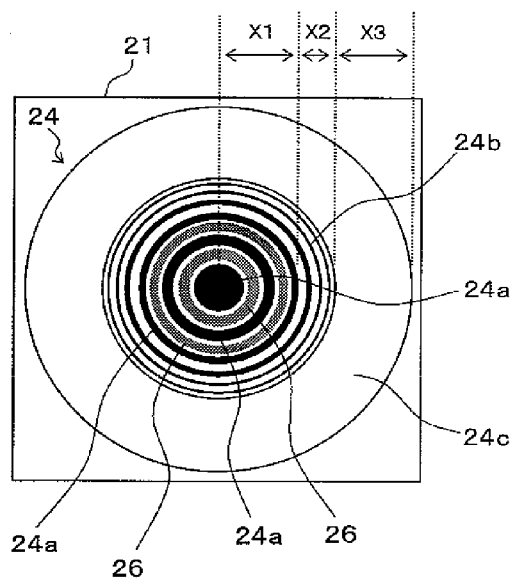
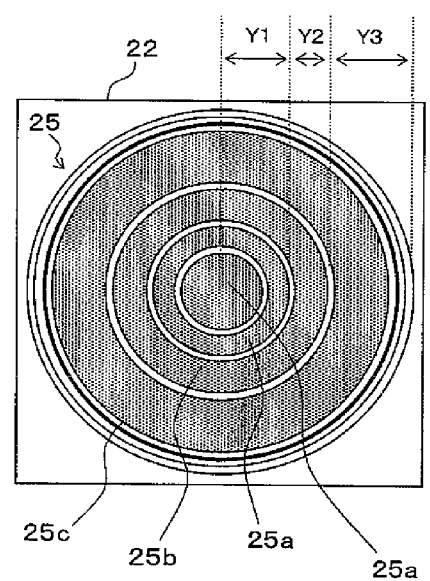

PRIOR ART

PRIOR ART

PRIOR ART

OPTICAL PICKUP

BACKGROUND OF THE INVENTION

1. Field of the Invention

The present invention relates to an optical pickup mounted on a DVD recorder and the like, and in particular, to an optical pickup including a liquid crystal element having an electrode pattern for correcting aberration.

2. Description of the Related Art

In an optical pickup for performing recordation and reproduction of information on the optical disc such as a CD (Compact Disc), a DVD (Digital Versatile Disc), and a BD (Blu-ray Disc; registered trademark), the specification of objective lens and light source differs depending on the type of optical disc. For instance, the numerical aperture (NA) of the objective lens is 0.50 for a CD, 0.65 for a DVD, and 0.85 for a BD, and the wavelength of the laser light is 780 nm for a CD, 650 nm for a DVD, and 405 nm for a BD.

As mentioned above, the numerical aperture of the objective lens and the wavelength of the laser light differ depending on the type of optical disc. If different optical pickup is used for each disc, the number of components increases thereby leading to enlargement of device and increase in cost. Therefore, an optical pickup compatible to a plurality of wavelengths that can correspond to various optical discs with one optical pickup is being developed. In order to reduce the number of components, enhance the assembly workability, and achieve miniaturization, the optical pickup mounted with only one objective lens is also being put to practical use.

However, when performing recordation and reproduction on a plurality of types of optical discs with one objective lens, the thickness of the protective layer which protects the recording layer of the disc differs depending on the type of optical disc, which becomes a cause of occurrence of spherical aberration in the optical system. Such spherical aberration degrades the optical spot formed on a recording layer of the optical disc, and lowers the recordation and reproduction performance. Furthermore, the distance from the objective lens to the protective layer, that is, the working distance in a case where the light beam is collected on the recording layer by the objective lens becomes particularly small for a CD due to the difference in thickness of the protective layer, thereby rising a problem of collision of the objective lens with the optical disc.

FIGS. 6A to 6C are views describing the problem of spherical aberration and working distance. FIG. 6A shows a case where the optical disc is a BD, where 101 is the recording layer and 102 is the protective layer. FIG. 6B shows a case where the optical disc is a DVD, where 201 is the recording layer and 202 is the protective layer. FIG. 6C shows a case where the optical disc is a CD, where 301 is the recording layer and 302 is the protective layer. A is the objective lens, L1 to L3 are light beams (laser lights) of each wavelength, and WD1 to WD3 are working distances. Here, assuming that the objective lens A is suitably designed for a BD, spherical aberration does not occur for a ED, but spherical aberration occurs for a DVD and a CD since the protective layers 202, 302 are thicker than the protective layer 102. Even for a BD, correction of spherical aberration is required if a BD has a plurality of recording layers. Furthermore, the working distance WD3 becomes very small for a CD having the thickest protective layer 302, and the objective lens A might collide with the disc surface.

As shown in FIG. 7, when recording and reproducing a CD, it is known that a liquid crystal element B including an electrode configuring a diffraction pattern is electrically controlled, and the light beam L3 is diverged by an angle α so as to enter the objective lens A as divergent light L3', thereby correcting the spherical aberration (see e.g., Japanese Unexamined Patent Publication No. 2006-252655). In this case, since the divergent light L3' enters the objective lens A, a large working distance WD3' can be ensured compared to that in FIG. 6C (WD3'>WD3), and the objective lens A is avoided from colliding with the disc surface. However, the spherical aberration of a BD having a plurality of recording layers cannot be corrected with only the means of FIG. 7.

It is known that spherical aberration can be corrected by electrically controlling the liquid crystal element including an electrode configuring a phase shift pattern and providing a phase difference to the light beam entered to the objective lens (see e.g., Japanese Unexamined Patent Publication No. 2006-12344 and Japanese Unexamined Patent Publication No. 2005-202323). Through the use of such a method, the spherical aberration can be corrected even for a BD having a plurality of recording layers, but two liquid crystal elements, one for generating divergent light and the other for phase shift, are required to ensure the working distance while correcting the spherical aberration of a CD and to correct the spherical aberration of each recording layer of a BD, which leads to increase in number of components and increase in cost.

The applicant thus proposed an optical pickup capable of correcting the spherical aberration and ensuring the working distance in a CD, and also capable of correcting the spherical aberration in each recording layer of a BD with one liquid crystal element (Japanese Patent Application No. 2006-227900). FIGS. 8 and 9 show the liquid crystal element according to the above previous application. The liquid crystal element 60 includes a concentric electrode pattern 64, where an electrode 66 of a diffraction pattern for generating the divergent light is arranged in a first region X on the inner side, and an electrode 67 of phase shift pattern is arranged in a second region Y on the outer side. A pair of substrates 61 and 62, a liquid crystal 63, and a common electrode 65 are arranged. Through the use of such liquid crystal element, the spherical aberration can be corrected and the working distance can be increased for a CD since divergent light is generated similarly to the conventional art by applying voltage to the electrode 66 of diffraction pattern. In a case of a BD, the spherical aberration of each recording layer of a BD can be corrected by turning OFF the voltage of the electrode 66 of diffraction pattern, and appropriately controlling the voltage of the electrode 67 of phase shift pattern.

FIGS. 10A and 10B are diagrams describing the correction of spherical aberration by the phase shift pattern of the second region Y. The heavy solid line of FIG. 10A shows the spherical aberration that occurs in the light beam when reproducing a BD. As shown in the figure, the spherical aberration becomes large at the outer peripheral side distant from the optical axis. Therefore, the degradation of reproduction quality caused by the spherical aberration can be suppressed by correcting the large spherical aberration that occurs mainly on the outer peripheral side. For this purpose, the number and area of the concentric region of the phase shift electrodes 67 in the second region Y should be set to values which can correct the spherical aberration that becomes larger towards the outer periphery. The thin solid line of FIG. 10A shows a correction pattern in a case where correcting the spherical aberration by adjusting the application voltage to be applied to each region, using a plurality of concentric regions which number and area of the region are determined as described above.

The heavy solid line of FIG. 10B shows the spherical aberration after correction by subtracting the correction pattern from the spherical aberration of FIG. 10A. Apparently, the spherical aberration can be reduced by performing the correction of changing the phase distribution in the second region Y. Hence, even in a case of a BD including a plurality of recording layers, the correction of the spherical aberration can be easily performed by voltage control of the phase shift electrodes 67.

However, in the case of the liquid crystal element 60, phase shift at the region X is impossible since the electrode 66 of the diffraction pattern and the electrode 67 of the phase shift pattern are concentrically arranged on the same substrate 61. Thus, the correction residual shown in FIG. 10B becomes large, and there is a limit to obtaining a satisfactory reproduction signal.

Japanese Unexamined Patent Publication No. 2006-286028 describes forming a concentric diffraction pattern on a pair of opposing substrates in the liquid crystal element for correcting spherical aberration, but the phase shift pattern is not referenced. Furthermore, Japanese Unexamined Patent Publication No. 2004-178773 describes forming an electrode pattern for correcting the spherical aberration of the BD on one substrate and forming an electrode pattern for correcting the spherical aberration of the DVD etc. on the other substrate, but there is a limit to further reducing the correction residual by simply arranging different electrode patterns separately on the substrate.

SUMMARY OF THE INVENTION

The present invention improves the problems of the prior invention, and aims to provide an optical pickup capable of further reducing the correction residual and obtaining a satisfactory reproduction signal in the correction of spherical aberration by the phase shift.

The present invention provides an optical pickup including a plurality of light sources for projecting light beams having different wavelengths to a plurality of types of optical discs; an objective lens for collecting the light beam projected from each light source onto a recording layer of each optical disc; and a liquid crystal element for correcting spherical aberration arranged in front of the objective lens when seen from the light source; wherein the liquid crystal element includes a pair of substrates, a liquid crystal arranged between the substrates, a diffraction pattern including concentric diffraction electrodes formed on one substrate, and a phase shift pattern including concentric phase shift electrodes formed on the other substrate. The diffraction pattern and the phase shift pattern are arranged so as to face each other. The diffraction pattern includes a first region being of a constant range in a radial direction from a center and having a wide electrode interval, and a second region being arranged on the outer side of the first region and having a narrow electrode interval. An additional electrode facing the phase shift electrode is arranged in a gap between the diffraction electrodes in the first region.

In the present invention, the diffraction pattern is arranged on one substrate of the liquid crystal element, and the phase shift pattern is arranged on the other substrate, and thus the phase shift can be operated irrespective of the region of the diffraction pattern. Furthermore, since the additional electrode is arranged between the electrodes in the first region having a wide electrode interval in the diffraction pattern, voltage can be applied with the phase shift region finely divided compared to when nothing is arranged between the electrodes. As a result, the correction residual is further reduced and a satisfactory reproduction signal can be obtained in the present invention.

In a typical embodiment of the present invention, the optical pickup includes a plurality of light sources for projecting light beams having different wavelengths to a CD and a BD; an objective lens for collecting the light beam projected from each light source onto a recording layer of each optical disc; and a liquid crystal element for correcting spherical aberration arranged in front of the objective lens when seen from the light source; wherein the liquid crystal element includes a pair of substrates, a liquid crystal arranged between the substrates, a diffraction pattern including concentric diffraction electrodes formed on one substrate, and a phase shift pattern including concentric phase shift electrodes formed on the other substrate. The diffraction pattern and the phase shift pattern are arranged so as to face each other. The diffraction pattern includes a first region being of a constant range in a radial direction from a center and having a wide electrode interval, a second region being arranged on the outer side of the first region and having a narrow electrode interval, and a third region being arranged on the outer side of the second region and including a single diffraction electrode. An additional electrode facing the phase shift electrode is arranged in a gap between the diffraction electrodes in the first region. In reproducing the CD, the phase shift electrodes all have the same potential and a constant voltage is applied between the phase shift electrodes and the diffraction electrodes to diffract the light beam entering the diffraction pattern and convert the light beam to a divergent light diverged by a predetermined angle. In reproducing the BD, the diffraction electrodes and the additional electrodes all have the same potential, and a voltage is individually applied between these electrodes and the phase shift electrodes to change an index of refraction of a portion of each phase shift electrode and provide a phase difference to the light beam passing through the phase shift pattern.

According to the present invention, the diffraction pattern and the phase shift pattern are respectively arranged on the pair of substrates of the liquid crystal element, and the additional electrode is arranged between the electrodes in the first region of the diffraction pattern, whereby an optical pickup capable of further reducing the correction residual and obtaining a satisfactory reproduction signal is provided.

BRIEF DESCRIPTION OF THE DRAWINGS

FIG. 2 is a cross sectional view of a liquid crystal element;

FIGS. 3A and 3B are plan views of a diffraction pattern and a phase shift pattern;

DETAILED DESCRIPTION OF THE PREFERRED EMBODIMENTS

Figure 1:
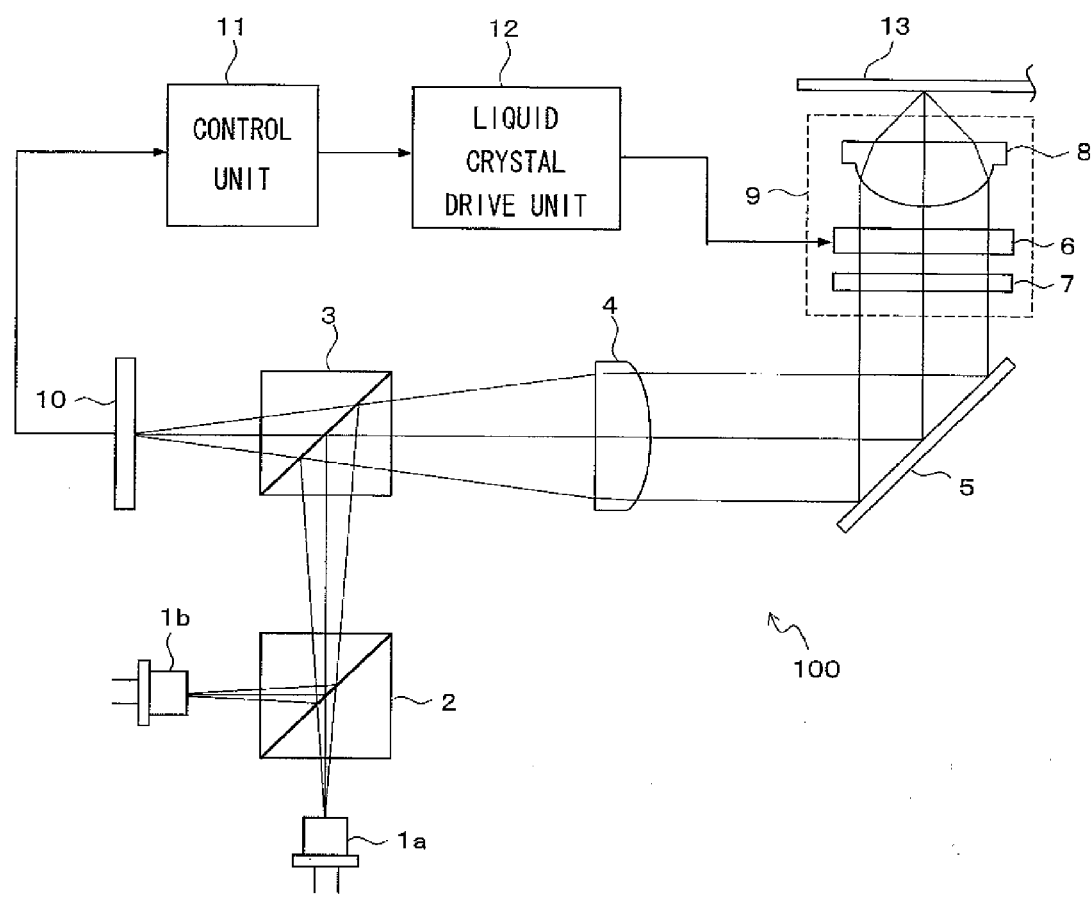
FIG. 1 is a schematic configuration view of an optical pickup according to an embodiment of the present invention.

Embodiments of the present invention will now be described with reference to the drawings. FIG. 1 is a schematic configuration view of an optical pickup according to the embodiment of the present invention. An example of an optical pickup 100 of 3-wavelength compatible type that can correspond to three types of optical discs such as a CD, a DVD, and a BD will be described.

In FIG. 1, a light source 1a for a CD and a DVD includes two semiconductor lasers for projecting an infrared laser having a wavelength of 780 nm and a red laser light having a wavelength of 650 nm. A light source 1b for a BD includes a semiconductor laser for projecting a blue laser light having a wavelength of 405 nm. A prism 2 transmits and straightly advances the laser light from the light source 1a, and reflects the laser light from the light source 1b to change the light path by 90°. A prism 3 reflects the light transmitted through the prism 2 towards the collimator lens 4 side at an angle of 90°, and transmits the light from the collimator lens 4. The collimator lens 4 is a lens for converting the laser light reflected by the prism 3 to parallel light. An up mirror 5 reflects the light passed through the collimator lens 4 upward at an angle of 90°.

A liquid crystal element 6 corrects the spherical aberration occurring in recordation and reproduction of a CD and a BD. A phase shift element 7 corrects the spherical aberration occurring in recordation and reproduction of a DVD. An objective lens 8 collects the incident laser light on the disc surface. A movable actuator 9 incorporates the liquid crystal element 6, the phase shift element 7, and the objective lens 8. A light receiving unit 10 receives light reflected by the disc surface of the optical disc 13 through each optical component 3 to 8. A control unit 11 processes the signal output from the light receiving unit 10 and performing a predetermined control. A liquid crystal drive unit 12 drives the liquid crystal element 6 based on the output from the control unit 11.

The laser light projected from the light sources 1a, 1b are reflected by the prism 3 at 90° through the prism 2, converted to parallel light by the collimator lens 4, and then collected on the recording layer of the optical disc 13 through the up mirror 5, the phase shift element 7, the liquid crystal element 6, and the objective lens 8, thereby forming a microscopic optical spot. The reflected light from the recording layer of the optical disc 13 is received by the light receiving unit 10 through each optical component 3 to 8. The signal output from the light receiving unit 10 is provided to the control unit 11. The control unit 11 controls the liquid crystal drive unit 12 based on the output signal of the light receiving unit 10, and the liquid crystal drive unit 12 controls the liquid crystal element 6 to be hereinafter described. The control unit 11 detects the focus error and the tracking error based on the output signal of the light receiving unit 10, and performs servo control such as focus control and tracking control. The servo control system is not shown in FIG. 1 as the servo control system is not directly related to the present invention.

FIGS. 2 and 3 are views showing a detailed configuration of the liquid crystal element 6. FIG. 2 is a cross sectional view of the liquid crystal element 6, FIG. 3A is a plan view of a diffraction pattern 24, and FIG. 3B is a plan view of a phase shift pattern 25. FIG. 2 shows a cross section of a right half region in each pattern of FIG. 3.

As shown in FIG. 2, the liquid crystal element 6 includes a pair of transparent substrates 21 and 22 facing each other with a liquid crystal 23 in between, transparent electrodes 24a to 24c arranged on the substrate 21 and configuring the diffraction pattern 24, and transparent electrodes 25a to 25c arranged on the substrate 22 and configuring the phase shift pattern 25. The diffraction pattern 24 has a function of diverging the light beam, and the phase shift pattern 25 has a function of providing phase difference to the light beam. The diffraction pattern 24 and the phase shift pattern 25 face each other. The liquid crystal 23 is made up of, for example, nematic liquid crystals, where when voltage is applied to the transparent electrodes 24a to 24c, and 25a to 25c, the orientation direction of the liquid crystal molecules of the voltage applied portion changes and the index of refraction changes. The transparent electrodes 24a to 24c and 25a to 25c are made up of, for example, ITO (Indium Tin Oxide). The transparent substrates 21 and 22 are made of glass etc.

As shown in FIG. 3A, the diffraction pattern 24 is configured by concentrically arranged transparent electrodes (hereinafter referred to as "diffraction electrode") 24a to 24c, and includes a first region X1, a second region X2, and a third region X3. The first region X1 is a constant range in the radial direction from the center of the diffraction pattern 24, where the electrode interval of the diffraction electrode 24a belonging to the region X1 is wide, as apparent from FIG. 2. An additional electrode 26 facing the transparent electrode 25a of the phase shift pattern 25 is arranged in the gap between the diffraction electrodes 24a. The second region X2 is on the outer side of the first region X1, where the electrode interval of the diffraction electrode 24b belonging to the region X2 is narrow, as apparent from FIG. 2. The additional electrode 26 is thus not arranged in the region X2. The third region X3 is on the outer side of the second region X2, and includes a single doughnut-shaped diffraction electrode 24c.

As shown in FIG. 3B, the phase shift pattern 25 is also configured by concentrically arranged transparent electrodes (hereinafter referred to as "phase shift electrode") 25a to 25c, and includes first to third regions Y1 to Y3. The range of the regions Y1 to Y3 is the same as the range of the regions X1 to X3. As apparent from FIG. 2, the phase shift electrodes 25a to 25c belonging to each region Y1 to Y3 are arranged while maintaining a microscopic gap.

Each diffraction electrode 24a to 24c is applied with the same voltage by the liquid crystal drive unit 12 of FIG. 1. In this case, the phase shift electrodes 25a to 25c are all assumed to have the same potential (0V by ground), and are used as a common electrode. Each phase shift electrode 25a to 25c is individually applied with voltage by the liquid crystal drive unit 12 of FIG. 1. In this case, the diffraction electrodes 24a to 24c and the additional electrode 26 are all assumed to have the same potential (0V by ground), and are used as a common electrode.

Figure 4:
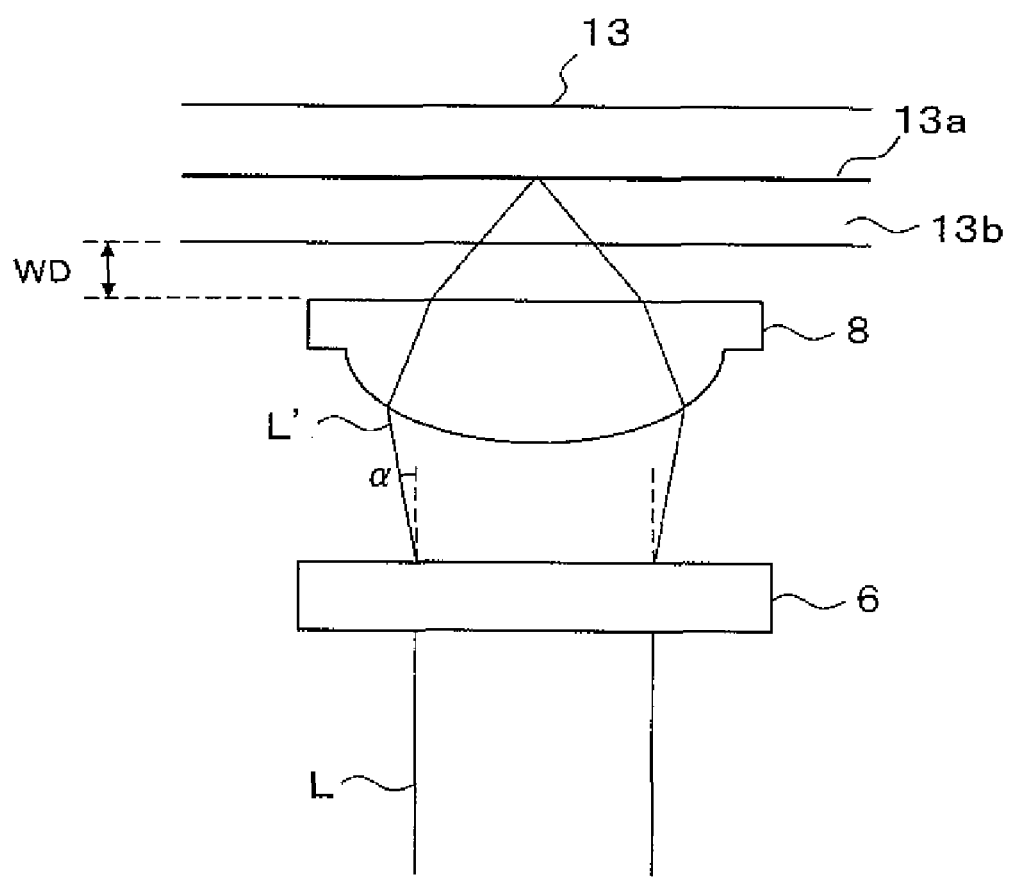
FIG. 4 is a view describing correction of spherical aberration by a diffraction pattern.
Figure 7:
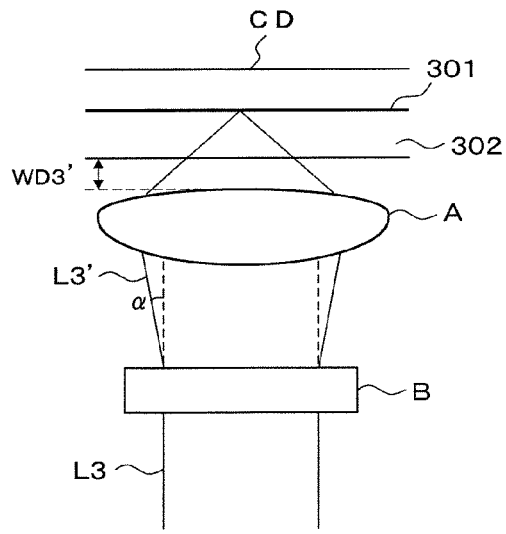
FIG. 7 is a view describing correction of spherical aberration by divergence of light beam.
Figure 8:
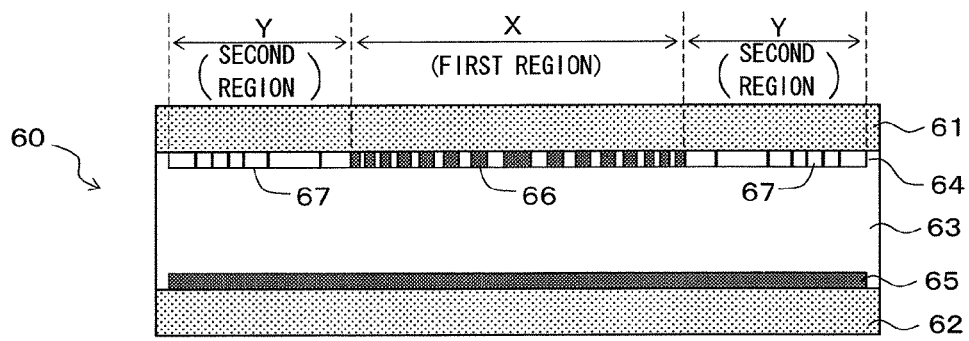
FIG. 8 is a cross sectional view of a liquid crystal element according to a previous application.
Figure 9A:
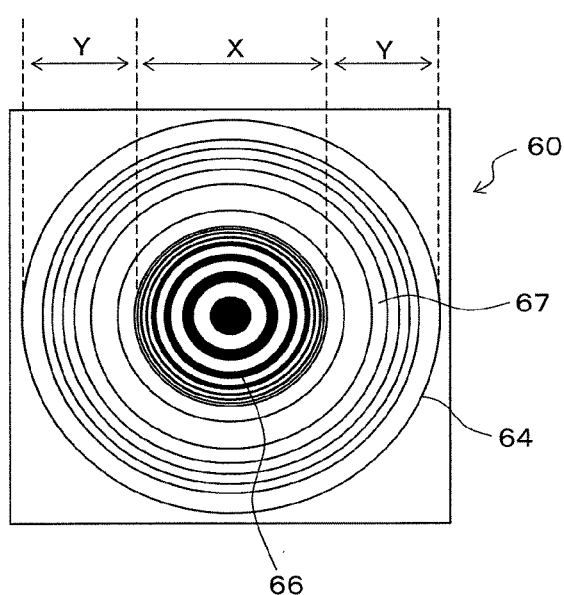
FIGS. 9A and 9B are plan views of electrode patterns in the liquid crystal element of FIG. 8.
Figure 9B:
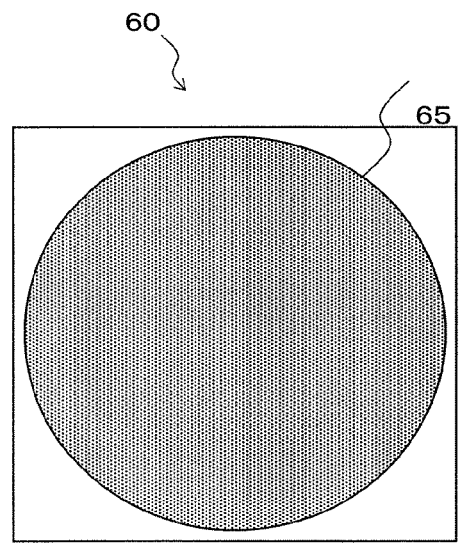

The diffraction pattern 24 is used as a spherical aberration correcting region for a CD in which the numerical aperture used is small. The liquid crystal 23 has a uniform index of refraction n1 over the entire regions X1 to X3 of the diffraction pattern 24 when voltage is not applied to the diffraction electrodes 24a to 24c and the additional electrode 26, and is oriented so as not to optically act on the light beam passing through. Thus, the light beam transmits through the regions X1 to X3 as it is without being diffracted. If a constant voltage is applied to the diffraction electrodes 24a to 24c (in this case, voltage is not applied to the additional electrode 26) by the liquid crystal drive unit 12, the orientation direction of the electrode portion in the liquid crystal 23 changes, and the index of refraction of the relevant portion changes from n1 to n2. Therefore, the portion in which the index of refraction is n1 and the portion in which the index of refraction is n2 are concentrically formed in an alternate manner in the regions X1 to X3. Thus, as shown in FIG. 4, the light beam L entering the liquid crystal element 6 is converted to divergent light L' diverged by angle α through diffraction by the diffraction pattern 24, and entered to the objective lens 8. As a result, when the optical disc 13 is a CD, the spherical aberration due to the thickness of the protective layer 13b can be corrected, and the working distance WD of when light beam collected on the recording layer 13a can be greatly ensured, similar to a case of FIG. 7.

The phase shift pattern 25 is used as a spherical aberration correcting region for a BD in which the numerical aperture used is large. The liquid crystal 23 has a uniform index of refraction n1 over the entire regions Y1 to Y3 when the voltage is not applied to the phase shift electrodes 25a to 25c, and is oriented so as not to optically act on the light beam passing through. Thus, the light beam transmits through the regions Y1 to Y3 as it is. If voltage is applied to the phase shift electrodes 25a to 25c by the liquid crystal drive unit 12, the orientation direction of the electrode portion in the liquid crystal 23 changes, and the index of refraction of the relevant portion changes. In this case, the voltage can be individually applied to each electrode 25a to 25c, and thus the index of refraction in each region can be individually controlled by adjusting the value of the voltage. As a result, the spherical aberration can be corrected by providing phase difference to the light beam passing through each region.

In the present invention, the additional electrode 26 is arranged in the gap between the electrodes of the diffraction pattern 24, and thus when the phase shift pattern 25 is driven to provide phase difference to the light beam, voltage is applied not only to the liquid crystal 23 at the portion sandwiched by the diffraction electrode 24a and the phase shift electrode 25a but also to the liquid crystal 23 at the portion sandwiched by the additional electrode 26 and the phase shift electrode 25a in the region Y1 (X1). Thus, the distribution of the applied voltage in the region Y1 (X1) can be fined to reduce the correction residual described above. This will be described below.

Figure 5A:
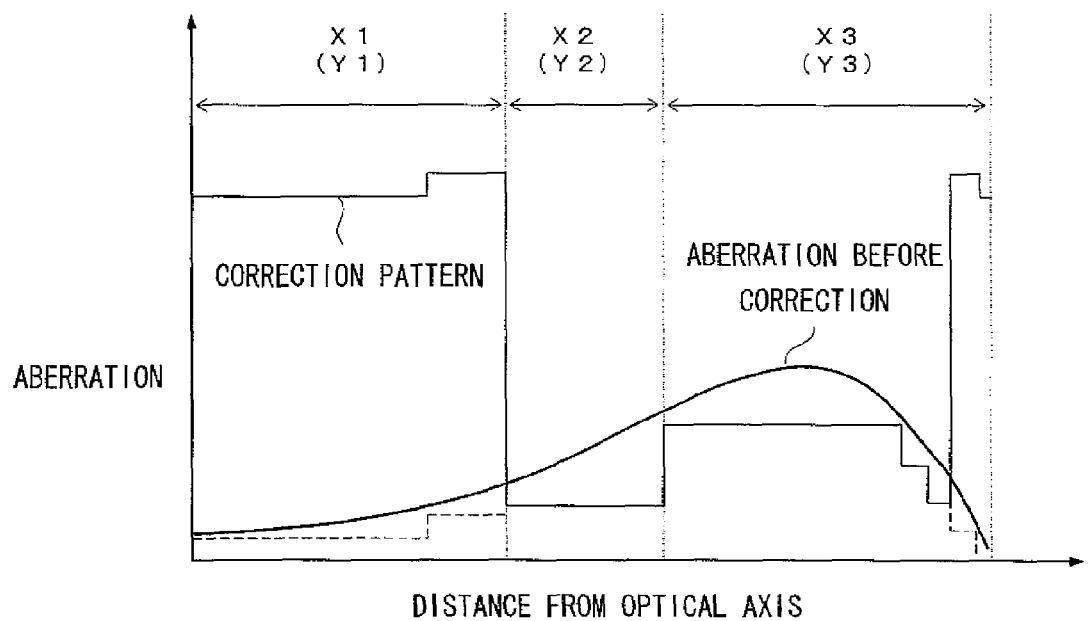
FIGS. 5A and 5B are diagrams describing correction of spherical aberration by a phase shift pattern.
Figure 5B:
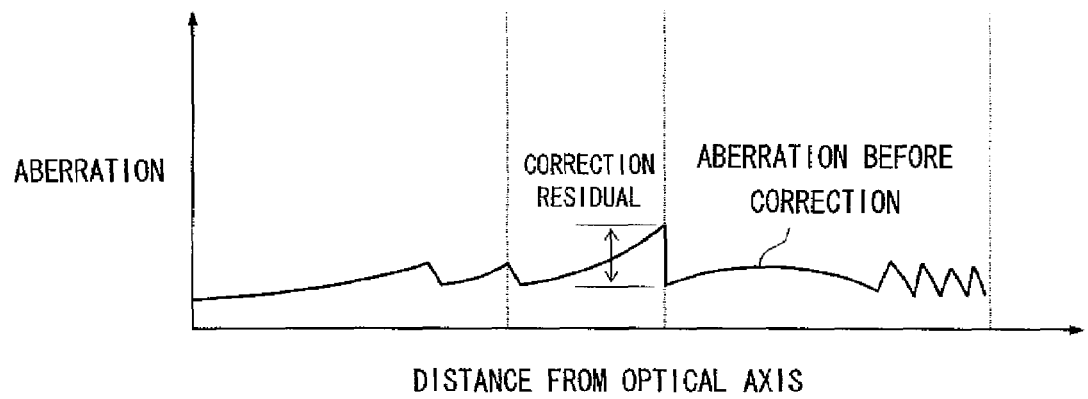
Figure 6A:
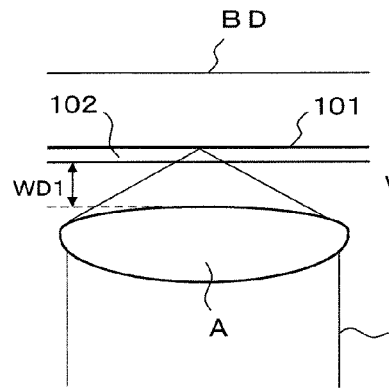
FIGS. 6A to 6C are views describing the problem of spherical aberration and working distance.
Figure 6B:
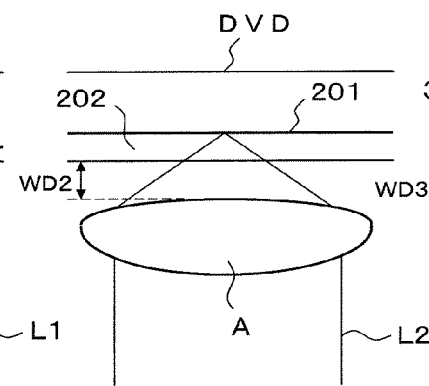
Figure 6C:
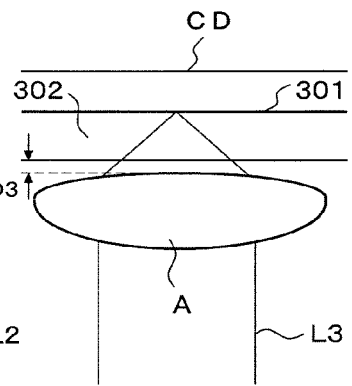
Figure 10A:
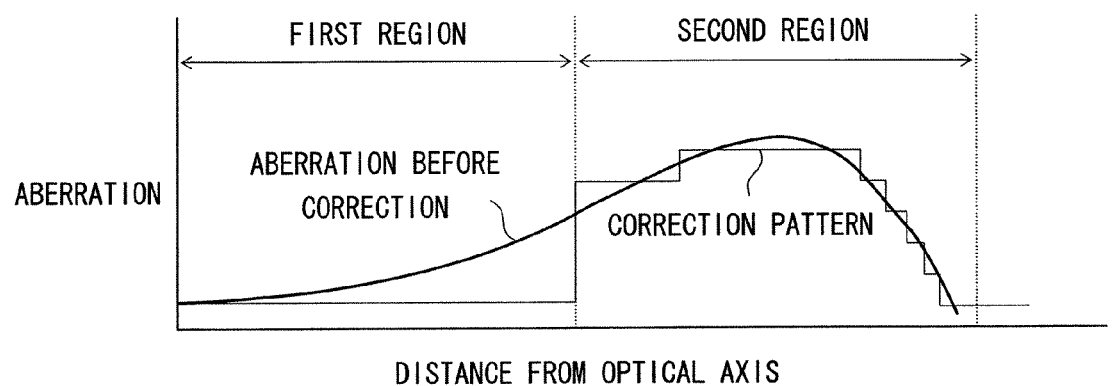
FIGS. 10A and 10B are diagrams describing correction of spherical aberration by the liquid crystal element of FIG. 8.
Figure 10B:
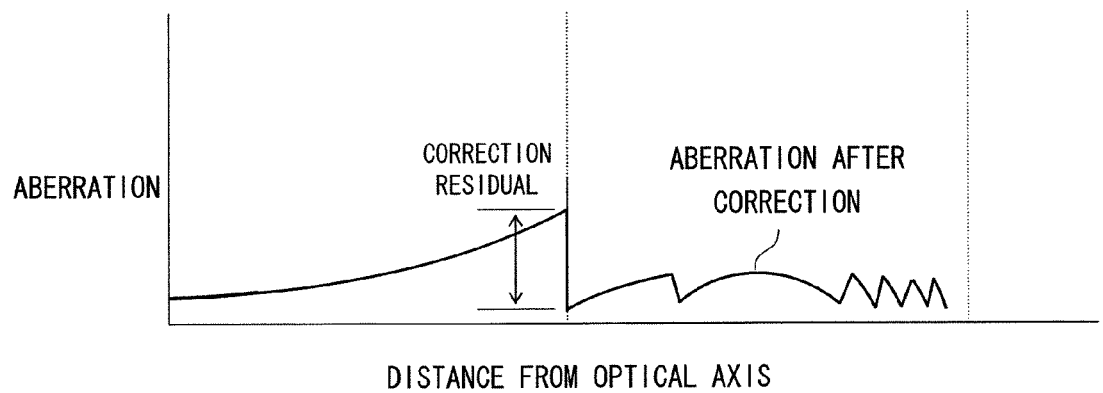

FIGS. 5A and 5B are diagrams describing the correction of spherical aberration by the phase shift pattern 25, corresponding to FIGS. 10A and 10B. The heavy solid line of FIG. 5A shows the spherical aberration that occurs in the light beam when reproducing the BD. In FIGS. 10A and 10B, the spherical aberration of the first region cannot be suppressed since phase shift in the first region close to the optical axis is not possible, and the correction residual is large even if the correction of the spherical aberration by the phase shift is performed in the second region. In FIGS. 5A and 5B, on the other hand, phase shift is possible even in the region X1 close to the optical axis, and furthermore, the correction pattern (applied voltage) in the phase shift region can be more finely set since the additional electrode 26 is arranged. Thus, the spherical aberration in regions X1, X2 is suppressed as in FIG. 5B, whereby the correction residual is reduced and satisfactory reproduction signal can be obtained.

Similar to FIGS. 10A and 10B, the number and area of the phase shift electrodes 25a to 25c are set to values such that the spherical aberration which becomes larger towards the outer periphery can be corrected in the case of FIGS. 5A and 5B. In FIG. 5A, the level of the correction pattern is high at an entire region of region X1 and a partial region of region X3 for the following reasons. The correction pattern of the region X1 will originally have a pattern shown with a broken line to correct the spherical aberration of region X1. Therefore, the relationship between the magnitude of the voltage to be applied to the phase shift electrode of each region becomes X1<X2<X3 in order to obtain the original correction pattern over the regions X1 to X3. However, since the width of the diffraction electrode 24b is narrow in region X2, as apparent from FIG. 2, potential difference is difficult to create between the diffraction electrode 24b and the phase shift electrode 25b, the voltage between the electrodes 24b and 25b thus becomes practically zero. Therefore, lower voltage cannot be applied to the phase shift electrode 25b of the region X1, and it is impossible to generate the correction pattern shown with a broken line. Thus, a voltage for generating a correction pattern of solid line shifted by one wavelength with respect to the correction pattern of the broken line is applied to the phase shift electrode 25b. The phase difference shifted by one wavelength is substantially the same as the original phase difference, and thus the desired correction pattern can be generated by controlling the voltage to be applied to the phase shift electrode 25b. The high level correction pattern at the right end of the region X3 is based on a similar reason.

According to the embodiment described above, with one liquid crystal element, the correction of the spherical aberration and ensuring of working distance are achieved for CD, and furthermore, the correction of the spherical aberration is achieved for BD having a plurality of recording layers, by using the liquid crystal element 6 including the diffraction pattern 24 and the phase shift pattern 25.

Since the diffraction pattern 24 is arranged on one substrate 21 of the liquid crystal element 6 and the phase shift pattern 25 is arranged on the other substrate 22, the phase shift can be operated irrespective of the region of the diffraction pattern 24.

Furthermore, since the additional electrode 26 is arranged between the diffraction electrodes 24a in the first region X1 having a wide electrode interval in the diffraction pattern 24, voltage can be applied with the phase shift region finely divided compared to when nothing is arranged between the electrodes. Thus, when correcting the spherical aberration by the phase shift for BD, the correction residual is further reduced and satisfactory reproduction signal can be obtained.

The correction of spherical aberration with respect to a DVD is performed by the phase shift element 7. The phase shift element 7 is not essential in the present invention, and thus will only be briefly described below. The phase shift element 7 has a phase shift region formed by a step difference formed in step-form on a transparent substrate, where the phase distribution changes as difference is created in passing time of the light beam in each phase shift region. The spherical aberration can be corrected by change in phase distribution. An opening restricting part may be arranged as needed in the phase shift element 7. The light beam for a CD and the light beam for a ED transmit through the phase shift element 7 as it is without being subjected to optical effect by the element 7.

In the above embodiments, an example of optical pickup 100 compatible to three wavelengths that can correspond to three types of optical discs such as a CD, a DVD, and a RD has been described, but the present invention is also applicable to other optical pickups. For instance, the present invention can be applied to an optical pickup compatible to two wavelengths that can correspond to two types of optical disc such as a CD and a BD, or a DVD and a BD.

What is claimed is:
1. An optical pickup comprising:
a plurality of light sources for projecting light beams having different wavelengths to a plurality of types of optical discs;

an objective lens for collecting the light beam projected from each light source onto a recording layer of each optical disc; and a liquid crystal element for correcting spherical aberration arranged in front of the objective lens when seen from the light source; wherein the liquid crystal element includes a pair of substrates, a liquid crystal arranged between the substrates, a diffraction pattern including concentric diffraction electrodes formed on one substrate, and a phase shift pattern including concentric phase shift electrodes formed on the other substrate;

the diffraction pattern and the phase shift pattern are arranged so as to face each other;

the diffraction pattern includes a first region being of a constant range in a radial direction from a center, and a second region being arranged on the outer side of the first region; and an additional electrode facing the phase shift electrode is arranged in a gap between the diffraction electrodes in the first region.

2. An optical pickup comprising:

a plurality of light sources for projecting light beams having different wavelengths to a CD and a BD;

an objective lens for collecting the light beam projected from each light source onto a recording layer of each optical disc; and a liquid crystal element for correcting spherical aberration arranged in front of the objective lens when seen from the light source; wherein the liquid crystal element includes a pair of substrates, a liquid crystal arranged between the substrates, a diffraction pattern including concentric diffraction electrodes formed on one substrate, and a phase shift pattern including concentric phase shift electrodes formed on the other substrate;

the diffraction pattern and the phase shift pattern are arranged so as to face each other;

the diffraction pattern includes a first region being of a constant range in a radial direction from a center, a second region being arranged on the outer side of the first region, and a third region being arranged on the outer side of the second region and including a single diffraction electrode;

an additional electrode facing the phase shift electrode is arranged in a gap between the diffraction electrodes in the first region;

in reproducing the CD, the phase shift electrodes all have the same potential and a constant voltage is applied between the phase shift electrodes and the diffraction electrodes to diffract the light beam entering the diffraction pattern and convert the light beam to a divergent light diverged by a predetermined angle; and in reproducing the BD, the diffraction electrodes and the additional electrodes all have the same potential, and a voltage is individually applied between these electrodes and the phase shift electrodes to change an index of refraction of a portion of each phase shift electrode and provide a phase difference to the light beam passing through the phase shift pattern.

* * * * *